(12) United States Patent
Koucouthakis et al.

(10) Patent No.: US 6,726,753 B2
(45) Date of Patent: Apr. 27, 2004

(54) COATED CARBON BRAKE DISC MATERIALS

(75) Inventors: Manuel G. Koucouthakis, Granger, IN (US); Michelle L. Shreve, South Bend, IN (US); Ken A. Thompson, Granger, IN (US); Michael N. Spross, Osceola, IN (US); Laurie A. Booker, South Bend, IN (US); Terence B. Walker, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/210,420

(22) Filed: Jul. 30, 2002

(65) Prior Publication Data

US 2004/0020728 A1 Feb. 5, 2004

(51) Int. Cl.⁷ .............................................. C09K 15/02
(52) U.S. Cl. ........................ 106/14.12; 106/36; 252/397
(58) Field of Search ................ 106/14.12, 36; 252/397

(56) References Cited

U.S. PATENT DOCUMENTS

| | | |
|---|---|---|
| 2,450,327 A | 9/1948 | Cogan et al. |
| 3,939,028 A | 2/1976 | Schiffarth et al. |
| 4,487,804 A | 12/1984 | Reven |
| 4,661,369 A | 4/1987 | Crane |
| 4,837,073 A | 6/1989 | McAllister et al. |
| 5,208,099 A | 5/1993 | Maiwald-Hiller et al. |
| 5,291,852 A | 3/1994 | Allera et al. |
| 5,298,311 A | 3/1994 | Bentson et al. |
| 5,547,717 A | 8/1996 | Scaringella et al. |
| 5,936,574 A | 8/1999 | Klaschka |
| 5,962,135 A * | 10/1999 | Walker et al. ............... 428/408 |
| 6,455,159 B1 * | 9/2002 | Walker et al. ............... 428/408 |
| 6,555,173 B1 * | 4/2003 | Forsythe et al. .......... 427/376.2 |

FOREIGN PATENT DOCUMENTS

| | | |
|---|---|---|
| DE | 11 96 561 B | 7/1965 |
| JP | 61-96095 | 5/1986 |
| JP | 5 043354 A | 2/1993 |
| JP | 8-303506 | 11/1996 |
| JP | 1-268898 | 10/1998 |
| WO | WO 01 60763 A | 8/2001 |

* cited by examiner

*Primary Examiner*—Anthony J. Green
(74) *Attorney, Agent, or Firm*—Larry J. Palguta

(57) ABSTRACT

Antioxidant coating compositions containing 10–75 wt % $H_2O$, 20–65 wt % $H_3PO_4$, 0.1–20 wt % alkali metal mono-, di-, or tri-basic phosphate, 0–2 wt % hydrated boron oxide, 0–18 wt % $KH_2PO_4$, 3–10 wt % of a transition metal oxide, and 0–20 wt % hydrated manganese phosphate, 0–25 wt % $Al(H_2PO_4)_3$, and 0–10 wt % $Zn_3(PO_4)_2$, provided that at least one of $Al(H_2PO_4)_3$, $Zn_3(PO_4)_2$, and hydrated manganese phosphate is present. Also, brake discs made from carbon composite articles having their surface treated with certain antioxidant coatings. During a manufacturing process, carbon matrix 15 of brake disc 11 is covered on its outer and inner edges with antioxidant layers 19 and portions of the working surface of brake disc 11 may also be covered with antioxidant layers 13, potentially decreasing the fitness of the brake disc for service. In accordance with this invention, brake disc 12 is manufactured from brake disc 11 by the removal from its working surface of antioxidant layers 13.

3 Claims, 2 Drawing Sheets

COATED CARBON BRAKE DISC MATERIALS

FIELD OF THE INVENTION

This invention relates to the manufacture of carbon-carbon brake discs. More particularly, this invention relates to brake discs which are coated with antioxidant compositions during the course of their preparation for use in braking systems.

BACKGROUND OF THE INVENTION

Carbon-carbon brake discs are widely used on commercial and military aircraft. Wide-bodied commercial jets required improved brake materials because traditional steel brake systems simply could not absorb all of the thermal energy created during stops associated with landings. Carbon-based composites were developed which provide heat capacity, thermal conductivity, and thermal strength able to meet the demanding conditions involved in landing big jets. On the military side, the lower weights as well as the thermal and strength properties of the carbon composites has helped to ensure their acceptance in brake applications.

The production of carbon-carbon composite materials, including brake friction materials, has been described extensively in the prior art. One commonly used production method comprises molding a carbon fiber composite with a carbonizable resin, e.g. a phenolic resin, carbonizing the composite "preform", and then densifying the resulting porous material using chemical vapor infiltration (CVI) and/or resin impregnation processes. Another method comprises building up a fiber preform with textile materials and subsequently densifying the preform using a CVI process. Different structural types of carbon (graphitic, glassy, and pyrolytic) comprise the brake disc, which is somewhat porous. Further densification can be accomplished with, e.g., furfuryl alcohol infiltration or through incorporation into the carbon matrix of ceramic additives via infiltration with colloidal ceramics and their subsequent conversion to refractory materials.

Carbon-carbon brake disc friction performance is dictated by the carbon microstructure which arises from the manner in which the brake disc is manufactured. The amount of graphitization, for instance, can dramatically affect frictional and wear properties. Overall brake performance is particularly affected by the individual components, including fibers and types of matrix materials, at the friction surface.

One source of problems with these carbon composites is that they have low resistance to oxidation, by atmospheric oxygen, at elevated temperatures, that is, temperatures of 500° C. (932° F.) or higher. Oxidation not only attacks the surface of the carbon-carbon composites but also enters pores that invariably are present in such structures and oxidizes the carbon fibers adjacent to the pores and surfaces of the pores, thereby weakening the composites.

Exterior surfaces of carbon-carbon composites are therefore sometimes coated with a ceramic material such as silicon carbide to prevent entry of oxidizing agents such as molecular or ionic oxygen from the atmosphere, into the carbon-carbon composites. Silicon carbide and other antioxidant coatings are described in detail in U.S. Pat. No. 4,837,073. The exterior surfaces of carbon-carbon composites may be, alternatively, coated with a glass-forming seal coat such as a boron or boron/zirconium substance. Borate glasses have also been used from the protection of carbon-carbon composites against oxidation. U.S. Pat. No. 5,208,099 describes antioxidant coatings that are formed from a $SiO_2$—$B_2O_3$ gel and/or sol having a $SiO_2$:$B_2O_3$ molar composition of 60–85:40–15. Borate glass antioxidant compositions are moisture-resistant and oxidation-resistant coatings composed of 40–80 weight-% $B_2O_3$, 5–30 weight-% $SiO_2$, 7–20 weight-% $Li_2O$, and 7–10 weight-% $ZrO_2$ are described in detail in U.S. Pat. No. 5,298,311.

U.S. patent application Ser. No. 09/518,013 (Golecki), filed Mar. 3, 2000, relates to carbon fiber or C—C composites that are useful in a variety of applications. Golecki teaches methods of protecting such composites against oxidation by coating them with fluidized-glass type mixtures. The fluidized-glass mixtures are maintained as liquid precursors and are applied to components formed of carbon fiber or C—C composites. Once coated with the precursors, the coated C—C components are heat-treated or annealed for one or more cycles through a series of gradual heating and cooling steps. This creates glass coatings having thicknesses of about 1–10 mils. The thicknesses of the glass coatings may be varied by varying the composition of the fluidized glass precursor mixtures, the number of application cycles, and/or the annealing parameters.

The Golecki application teaches that the fluidized glass materials may comprise such materials as borate glasses (boron oxides), phosphate glasses (phosphorus oxides), silicate glasses (silicon oxides), and plumbate glasses (lead oxides). These glasses may include phosphates of manganese, nickel, vanadium, aluminum, and zinc, and/or alkaline and alkaline earth metals such as lithium, sodium, potassium, rubidium, magnesium, and calcium and their oxides, and elemental boron and/or boron compounds such as BN, $B_4C$, $B_2O_3$, and $H_3BO_3$. By way of example, Golecki discloses a boron-containing liquid fluidized glass precursor mixture that includes 29 weight-% phosphoric acid, 2 weight-% manganese phosphate, 3 weight-% potassium hydroxide, 1 weight-% boron nitride, 10 weight-% boron, and 55 weight-% water.

U.S. patent application Ser. No. 09/507,414 (Walker and Booker), filed Feb. 18, 2000, likewise relates to carbon-carbon composites and graphitic materials. The Walker and Booker application has as objectives the protection of carbon-carbon composites or graphites at elevated temperatures up to and exceeding 850° C. (1562° F.) and the reduction of catalytic oxidation at normal operating temperatures. Walker and Booker achieve these objectives by employing a penetrant salt solution which contains ions formed from 10–80 wt % $H_2O$, 20–70 wt % $H_3PO_4$, 0.1–25 wt % alkali metal mono-, di-, or tri-basic phosphate, and up to 2 wt % $B_2O_3$. Their penetrant salt solutions also include at least one of $MnHPO_4 \cdot 1.6H_2O$, $Al(H_2PO_4)_3$, and $Zn_3(PO_4)_2$, in weight-percentages up to 25 wt %, 30 wt %, and 10 wt %, respectively.

SUMMARY OF THE INVENTION

The present invention provides, in one embodiment, a brake disc comprising a carbon composite body, wherein the surface of the brake disc is at least partially covered by a layer of an antioxidant composition that is readily visible even after charring. The brake disc of the present invention may be processed, before being incorporated into a brake system, to remove antioxidant composition that covers the working surface of the disc.

Another embodiment of the present invention is an antioxidant coating composition that is made up of from 10–75 wt % $H_2O$, 20–65 wt % $H_3PO_4$, 0.1–20 wt % alkali metal mono-, di-, or tri-basic phosphate, 0–2 wt % hydrated boron oxide, 0–18 wt % $KH_2PO_4$, 3–10 wt % of a transition metal oxide, and 0–20 wt % hydrated manganese phosphate, 0–25 wt % $Al(H_2PO_4)_3$, and 0–10 wt % $Zn_3(PO_4)_2$, provided that at least one of $Al(H_2PO_4)_3$, $Zn_3(PO_4)_2$, and hydrated manganese phosphate is present.

A preferred compositional embodiment of the present invention is made up of from 20–25 wt % $H_2O$, 40–45 wt % $H_3PO_4$, 10–15 wt % aluminum dihydrogen phosphate, 1–2 wt % $H_3BO_3$, 8–12 wt % $KH_2PO_4$, 2–5 wt % hydrated manganese phosphate, 2–5 wt % $Zn_3(PO_4)_2$, and 4–7 wt % of either $TiO_2$ or $CoCr_2O_4$, with the latter being especially preferred.

This invention also provides a brake disc made from a carbon composite article. In accordance with this invention, the surface of the article is treated with an antioxidant coating which contains from about 3 through about 10 weight-% of a transition metal oxide, and that transition metal oxide is selected so that the antioxidant coating (a) protects the carbon composite against oxidative weight loss, (b) does not abrogate friction properties of the composite, and (c) remains visible after charring.

This invention provides, in another of its aspects, methods for protecting carbon composite friction articles against oxidative weight loss. These methods of the invention may include preliminary steps of configuring carbon composite friction articles as a brake discs, steps of treating the surfaces of the composite articles with an antioxidant coatings that contain from about 3 through about 10 weight-% of a transition metal oxide—wherein the antioxidant coatings do not abrogate friction properties of the composite and wherein the antioxidant coatings remain visible after charring at 1600° F. for 6 hours—and subsequent steps of removing antioxidant coating from working surfaces of the brake discs.

BRIEF DESCRIPTION OF THE DRAWINGS

The present invention is illustrated by the drawings submitted herewith. The drawings are not to scale, and are submitted for the purpose of illustrating, but not limiting, certain aspects of the invention.

DETAILED DESCRIPTION OF THE INVENTION

Figure 1:
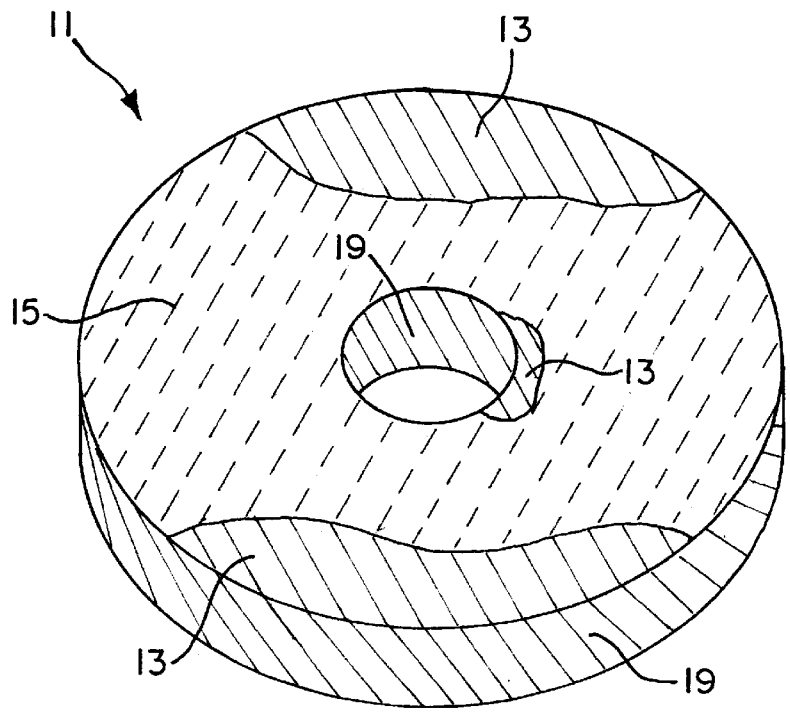
FIG. 1 illustrates a brake disc in accordance with the present invention.

The present invention provides a brake disc comprising a carbon composite body. Methods of manufacturing carbon-carbon composites configured as brake discs are well known in industry, as discussed hereinbelow. The surface of carbon composite body in accordance with this invention has been treated with a coating that protects the carbon composite against oxidative weight loss, that does not abrogate friction properties of the composite, and that remains visible after charring.

The feature "protection against oxidative weight loss" does not indicate absolute protection against any weight loss, but instead indicates reduction in weight loss as compared to an otherwise identical carbon composite that is not coated. For instance, after oxidation for 24 hours at 1200° F., weigh losses of up to 5% would be acceptable, with weight losses of not more than approximately 1.5% being preferred. Likewise, after oxidation for 6 hours at 1600° F., weigh losses of up to 20% would be acceptable, with weight losses of not more than approximately 15% being preferred.

The feature "no abrogation of friction properties" does not indicate absolute protection against any deterioration in friction properties due to the presence of a coating on the carbon composite body, but instead indicates no substantial deterioration of friction properties as compared to comparable coated carbon composite bodies. For instance, where a dynamometer test shows a brake efficiency for uncoated samples of approximately 0.3, samples coated with an un-enhanced antioxidant composition (that is, not in accordance with this invention) have a brake efficiency of approximately 0.2 and samples coated with an enhanced antioxidant composition in accordance with this invention likewise have a brake efficiency of approximately 0.2.

The feature "visible after charring" indicates that the coatings in accordance with the present invention are readily discernable by the naked eye of a (non-color blind) human observer. Visibility of a coating after charring is a function both of the difference in color between the charred coating and uncoated portions of the (normally charcoal gray) carbon composite body and of the spatial density of the charred colored mineral that remains on the coated surfaces. It generally cannot be predicted in advance what metal oxides will provide visual enhancement of coated carbon composites in accordance with the present invention. However, those skilled in the art can readily determine whether a particular antioxidant coating meets this criterion of the present invention simply by applying it to a carbon composite base, charring the coated article at 1600° F. for six hours, and then looking at it in ambient lighting to see whether the coating is fully and easily visible—that is, visible to the extent that its appearance on any portion of the surface of the (dark gray) composite article is readily apparent.

In accordance with the present invention, at some stage of the manufacturing process, the working surface of the brake disc may be partially covered by a layer of antioxidant composition containing a visible pigment. The terminology "working surface of the brake disc" refers to that portion of the brake disc that frictionally engages with a brake pad during a braking operation.

The "working surface" of the brake disc should present the maximum possible frictional properties to the brake pad. Accordingly, the present invention contemplates processing the brake disc, before incorporating it into a brake system, to remove the layer of antioxidant composition from the working surface of the disc. This antioxidant layer removal step, for example utilizing a sanding procedure, is facilitated by the presence of visible pigments in the antioxidant layer. However, due to the high temperature and friction demands of brake disc applications, especially jet aircraft brake disc applications, only certain visible pigments will be suitable in this context. The present application describes how such pigments can be selected.

The Carbon Matrices

Carbon-carbon composites are generally prepared from carbon preforms. Carbon preforms are made of carbon fibers, formed for instance of pre-oxidized polyacrylonitrile (PAN) resins. These fibers can be layered together to form shapes, such as friction brake discs, which shapes are then heated and infiltrated with methane or another pyrolyzable carbon source to form the C—C composite preforms. Carbon-carbon composites useful in accordance with the present invention typically have densities in the range of from about 1.6 g/cm$^3$ through 1.9 g/cm$^3$. Methods of manufacturing C—C composites are generally well known to those skilled in the art. A good reference in this area is: Buckley et al., *Carbon-Carbon Materials and Composites*, Noyes Publications, 1993. The entire contents of this publication are hereby expressly incorporated by reference.

For purposes of illustration only, the C—C composite component 10 may be fabricated from woven fabric panes of pitch-based Amoco P30X carbon fiber tows in a harness satin weave or from a pitch-based Nippon XNC25 in a plain weave. The tows are rigidized with a few weight-% carbon-containing resin, such as epoxy Novolac. The material is then carbonized at a temperature in the range of 800–1000° C. (1472–1832° F.) and densified by carbon CVD. The resulting materials is then annealed in an inert gas at a temperature in the range of 1600–2600° C. (2912–4712° F.). This process creates a C—C composite component that is adaptable for use in high temperature environments when it is properly protected against oxidation. It is understood that the oxidation protective coating system of the present invention is applicable to C—C composite components regardless of how the C—C composite components are fabricated.

Visibility Testing

Eight blocks were made from carbon composite material designed to be used to make brake discs for F-15 fighter jets. Four pairs of the blocks were coated, respectively, with antioxidant formulations as described in the following Table (percentages are by weight):

| "Blue" | "Green" | "Yellow" | "White" |
|---|---|---|---|
| 42.7% H$_3$PO$_4$ · H$_2$O | 42.7% H$_3$PO$_4$ · H$_2$O | 42.7% H$_3$PO$_4$ · H$_2$O | 42.7% H$_3$PO$_4$ · H$_2$O |
| 11.8% Al(H$_2$PO$_4$)$_3$ · H$_2$O | 11.8% Al(H$_2$PO$_4$)$_3$ · H$_2$O | 11.8% Al(H$_2$PO$_4$)$_3$ · H$_2$O | 11.8% Al(H$_2$PO$_4$)$_3$ · H$_2$O |
| 23.6% H$_2$O (de-ionized) | 23.6% H$_2$O (de-ionized) | 23.6% H$_2$O (de-ionized) | 23.6% H$_2$O (de-ionized) |
| 3.0% Zn$_3$(PO$_4$)$_2$ · 2H$_2$O | 3.0% Zn$_3$(PO$_4$)$_2$ · 2H$_2$O | 3.0% Zn$_3$(PO$_4$)$_2$ · 2H$_2$O | 3.0% Zn$_3$(PO$_4$)$_2$ · 2H$_2$O |
| 2.5% Mn$_3$(PO$_4$)$_2$ · 2H$_2$O | 2.5% Mn$_3$(PO$_4$)$_2$ · 2H$_2$O | 2.5% Mn$_3$(PO$_4$)$_2$ · 2H$_2$O | 2.5% Mn$_3$(PO$_4$)$_2$ · 2H$_2$O |
| 1.4% H$_3$BO$_3$ | 1.4% H$_3$BO$_3$ | 1.4% H$_3$BO$_3$ | 1.4% H$_3$BO$_3$ |
| 10.1% KH$_2$PO$_4$ | 10.1% KH$_2$PO$_4$ | 10.1% KH$_2$PO$_4$ | 10.1% KH$_2$PO$_4$ |
| 5.0% CoAl$_2$O$_4$:MgO[a] | 5.0% CoCr$_2$O$_4$:TiO$_2$:ZnO[b] | 5.0% (Ti, Ni, Sb)O$_2$[c] | 5.0% TiO$_2$[d] |

[a]Ferro V-9250 Bright Blue
[b]Ferro V-12600 Camouflage Green
[c]Ferro V-9416 Yellow
[d]DuPont Ti-Pure R900

Each of the coated blocks was charred for 24 hours at 1200° F. Then the visibility, including coverage and consistency, of the charred coated blocks was evaluated visually. The "blue" antioxidant coating formulation took on a dull dark coloration that was not easily differentiated from the charcoal gray carbon composite body. The "green" formulation retained full color coverage over the area where it had been applied and was easily distinguished from the composite body even after charring. The "yellow" formulation was visible and where visible readily detectable after charring. However, most of the yellow coloration had disappeared from the coated portions of the carbon composite bodies. The "white" formulation was easily visible after charring and still had roughly 50% of its original coverage density throughout the coated portions of the carbon composite bodies. It was thus determined that the green and the white formulations shown above produced a coating which met the visibility criterion of the present invention.

Finishing the Brake Disc

Figure 2:
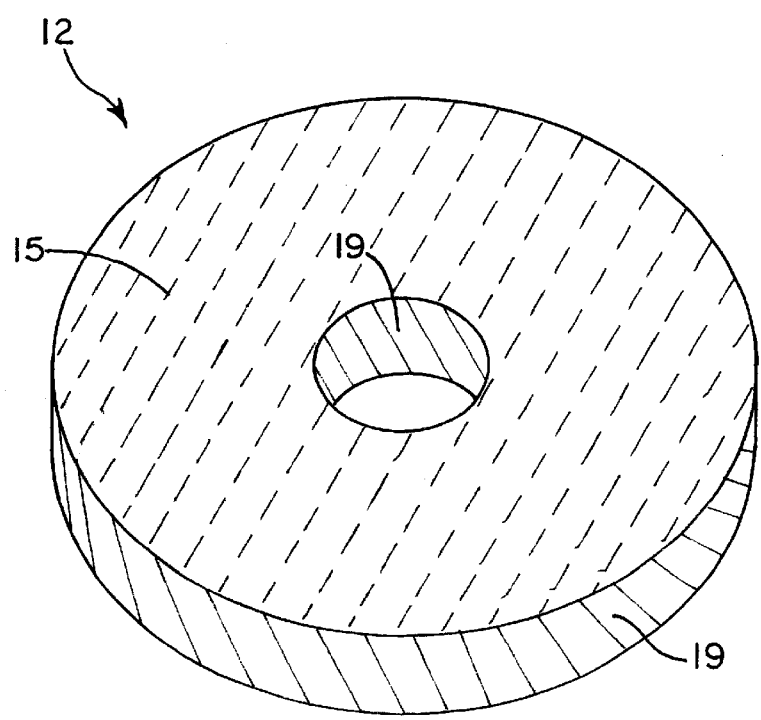
FIG. 2 illustrates a brake disc that has been manufactured from a brake disc of the present invention.

FIG. 1 illustrates a brake disc 11 in accordance with the present invention. In FIG. 1, carbon matrix 15 is covered on its outer and inner edges with antioxidant layers 19. Portions of the working surface of brake disc 11 are also covered with antioxidant layers 13, decreasing the fitness of the brake disc for service. FIG. 2 illustrates a brake disc 12 that has been manufactured from brake disc 11 of the present invention by the removal from its working surface, for example by sanding, of antioxidant layers 13.

Friction Properties Testing

Six sets of flat rings were made from carbon composite material designed to be used to make brake discs for F-15 fighter jets. Two of the sets were left uncoated. Two of the sets were coated with an antioxidant formulation having the following ingredients in the indicated weight percentages: 50.3% phosphoric acid, 13.9% mono-aluminum phosphate, 27.8% deionized water, 3.5% zinc phosphate, 2.9% manganese phosphate, and 1.6% boric acid. Two of the sets were coated with an antioxidant formulation enhanced in accordance with the present invention, having the following ingredients in the indicated weight percentages: 47.8% phosphoric acid, 13.2% mono-aluminum phosphate, 26.4% deionized water, 3.3% zinc phosphate, 2.8% manganese phosphate, 1.5% boric acid, and 5% titanium oxide.

The test procedure was as follows: 20 break-in stops at standard speed; twenty-five stops at 10% of standard speed; 25 stops at 25% of standard speed; and 50 stops at standard speed.

Figure 3:
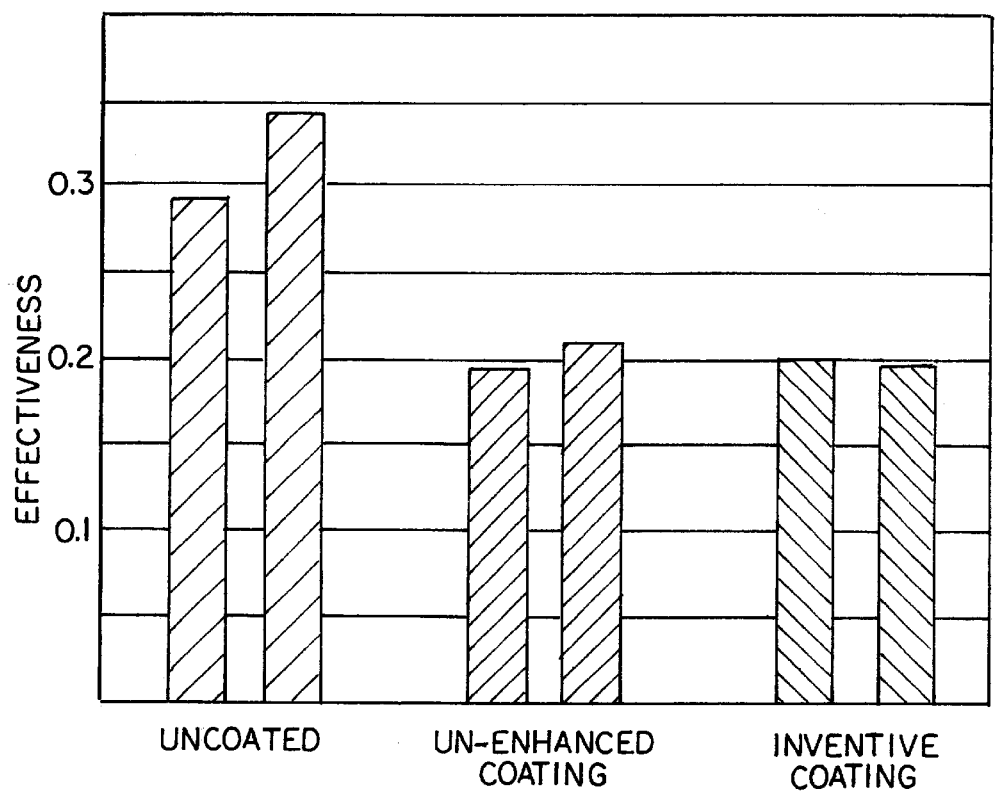
FIG. 3 graphically compares braking efficiencies of articles in accordance with the present invention with articles that are not included in the present invention.

The results are reported in FIG. 3. The average brake efficiency for the uncoated samples was approximately 0.3. The average brake efficiency for the samples coated with an un-enhanced coating was approximately 0.2. The average brake efficiency for the samples coated with a coating enhanced in accordance with the present invention was likewise approximately 0.2. These results therefore show no abrogation of friction properties due to enhancement of an antioxidant coating in accordance with the present invention.

What is claimed is:

1. An antioxidant coating composition comprising from 10–75 wt % H$_2$O, 20–65 wt % H$_3$PO$_4$, 0.1–20 wt % alkali metal mono-, di-, or tri-basic phosphate, 0–2 wt % hydrated boron oxide, 0–18 wt % KH$_2$PO$_4$, 3–10 wt % of a transition metal oxide, and 0–20 wt % hydrated manganese phosphate, 0–25 wt % Al(H$_2$PO$_4$)$_3$, and 0–10 wt % Zn$_3$(PO$_4$)$_2$, provided that at least one of Al(H$_2$PO$_4$)$_3$, Zn$_3$(PO$_4$)$_2$, and hydrated manganese phosphate is present.

2. The antioxidant coating composition of claim 1, comprising from 20–25 wt % H$_2$O, 40–45 wt % H$_3$PO$_4$, 10–15 wt % aluminum dihydrogen phosphate, 1–2 wt % H$_3$BO$_3$, 8–12 wt % KH$_2$PO$_4$, 2–5 wt % hydrated manganese phosphate, 2–5 wt % Zn$_3$(PO$_4$)$_2$, and 4–7 wt % of a transition metal oxide selected from the group consisting of TiO$_2$ and CoCr$_2$O$_4$.

3. The antioxidant coating composition of claim 2, wherein the transition metal oxide comprises CoCr$_2$O$_4$.

* * * * *